April 24, 1973   D. GOLD ET AL   3,729,553
PACKAGED EFFERVESCENT COMPOSITION
Original Filed April 23, 1970   2 Sheets-Sheet 1
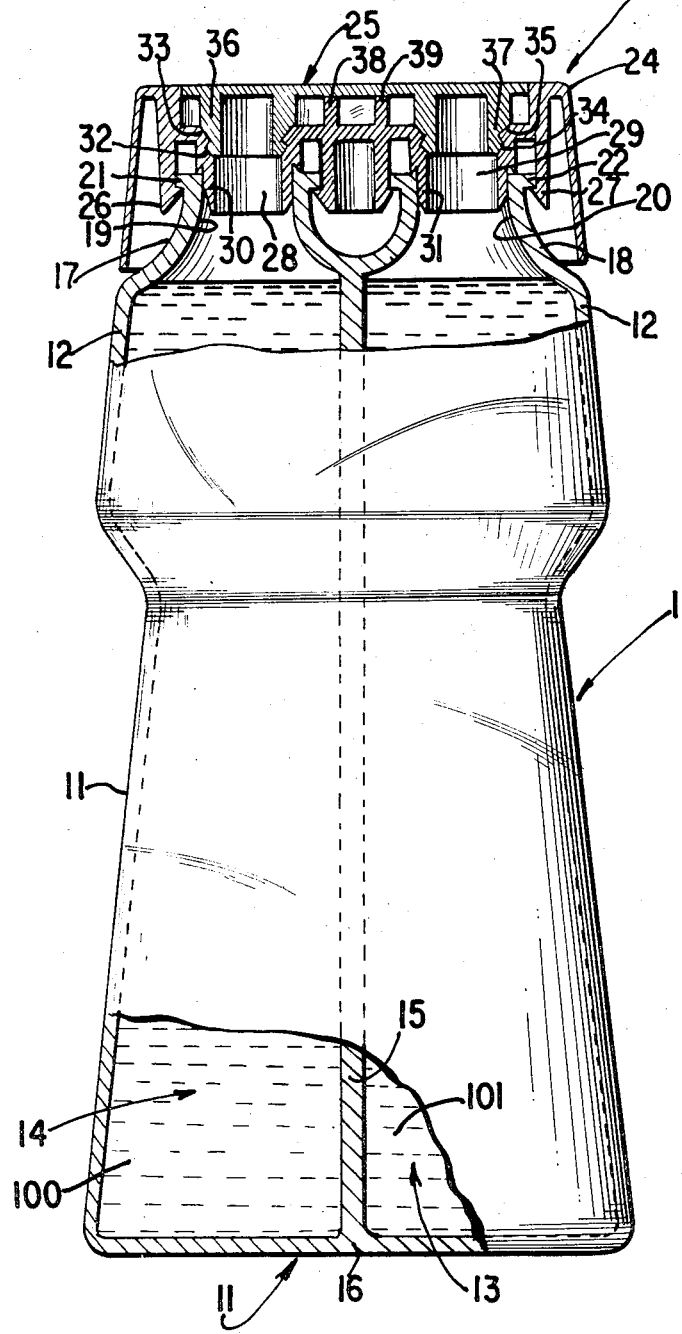
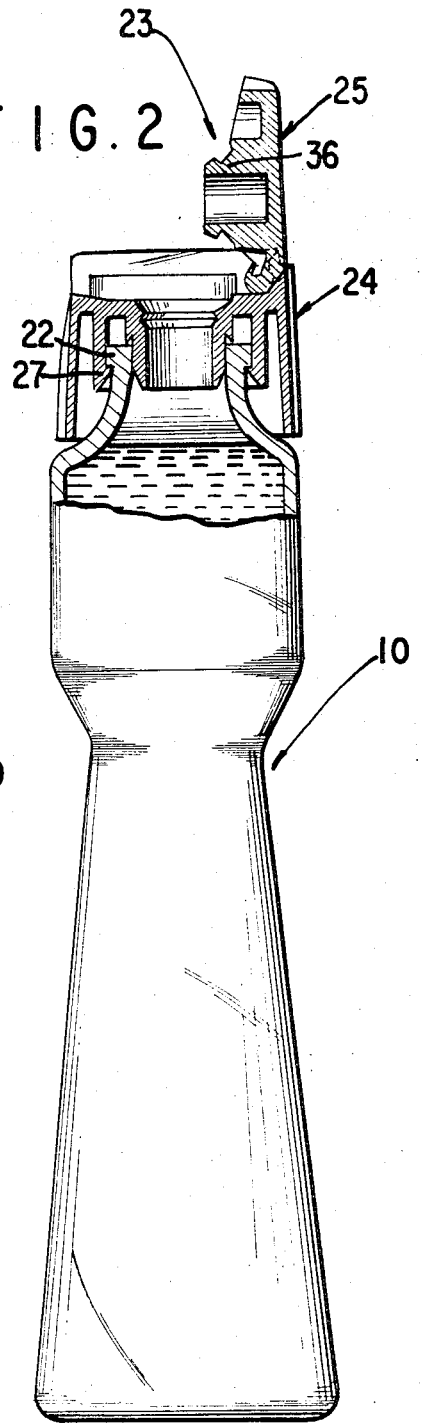
INVENTORS
BERNARD MISEK
DAVID GOLD
BY NORMAN BRAUN
ATTORNEY

INVENTORS
BERNARD MISEK
DAVID GOLD
BY NORMAN BRAUN

ATTORNEY

United States Patent Office 3,729,553
Patented Apr. 24, 1973

3,729,553
PACKAGED EFFERVESCENT COMPOSITION
David Gold, Yonkers, Bernard Misek, Pomona, and Norman Braun, Dover Plains, N.Y., assignors to Richardson-Merrell, Inc., New York, N.Y.
Continuation of application Ser. No. 31,136, Apr. 23, 1970. This application Mar. 17, 1972, Ser. No. 235,594
Int. Cl. A61k 7/16
U.S. Cl. 424—44   13 Claims

ABSTRACT OF THE DISCLOSURE

A packaged effervescent composition comprising a package having two compartments for storage of ingredients of said effervescent composition from which the ingredients are adapted to be dispensed simultaneously and proportionately for reaction with each other, the first compartment containing a solution of an effervescing producing reactant and the second compartment containing a complementary solution of an effervescing releasing reactant suitable for releasing the effervescence of the first compartment upon reaction with the effervescing producing reactant.

---

This is a continuation of application Ser. No. 31,136, filed Apr. 23, 1970.

This invention relates to a stabilized effervescent composition. More particularly, this invention relates to a packaged effervescent mouthwash composition which provides a novel means of generating fresh effervescence at the time of each dose and having enhanced stability, taste and odor qualities as well as increased levels of effervescence.

Effervescent mouthwash compositions, especially carbonated mouthwash compositions, have heretofore been recognized as having desirable and advantageous properties. Among the various reasons that have previously been advanced there may be mentioned the following: to release carbon dioxide gas promoting rapid dissolution of solid compositions in water, to supply the driving power for spraying a liquid into the mouth and to aid in the rapid distribution of other active ingredients. Additionally, it has been claimed that an aqueous solution of carbon dioxide dissolves calcium phosphate and carbonate to form a solution which induces a tooth enamel hardening process, exercises a solvent action on mucin and other tooth coatings, has an emulsifying action on saliva, as a disinfecting action for the treatment of mouth and teeth, removes tartar and prevents caries. However, despite all the technical advantages of an effervescent mouthwash no successful commercial product has yet appeared.

The reason for this lack of commercial acceptance of effervescent mouthwash compositions appears to reside in the fact that previous attempts to provide a suitable effervescent mouthwash composition resided in adaptations of solid dosage forms such as effervescing powders, granules or tablets or in carbonating a liquid and containing it in some form of pressurized container or generating it at the time of use with a carbon dioxide cartridge. These approaches, however, suffer from a number of major disadvantages. For example, solid dosage forms of effervescent mouthwash compositions suffer from poor taste and flavor since the solid dosage form is severely limited in the quantity and nature of flavoring agents and alcohol that may be included so that the required dilution of the product in water results in insufficient flavor and subjective impact when judged against conventional mouthwashes. Additionally, such products are generally on the "flat" side due to insufficient carbonation in the solution since the time required for dissolution of the product results in excessive loss of carbon dioxide. Also, the site of formation of carbon dioxide is in close proximity to undissolved chemical reactants and supersaturation of the liquid is not favored since the particulate solids act as nuclei for premature bubble formation. Furthermore, the procedure necessary to utilize the approach is often cumbersome and inconvenient.

The carbonated liquid in a pressurized container approach also suffers from serious disadvantages. For example, the mouthwash container is utilized many times by a person over a period of possibly two months or longer leading to a problem of instability. Each time the product is released the solution is disturbed causing carbon dioxide to be lost. Continually increasing headspace in the closed container also serves as a reservoir for further escape of carbon dioxide. These factors become increasingly critical at room temperature storage because carbon dioxide becomes less soluble with increasing temperature. The physical carbonation process is also undesirable from the standpoint of requiring expensive, high pressure carbonating equipment and additionally due to a hazard of explosion since higher temperature storage increases headspace pressure in the container.

It is, therefore, an object of this invention to provide an effervescent composition particularly an effervescent mouthwash, that is devoid of the foregoing problems and disadvantages. A further object of this invention is to provide an effervescent mouthwash having sufficient effervescence to provide user acceptance. Another object of this invention is to provide an effervescent mouthwash containing sufficient aromatics and alcohol to provide a full taste character. Still another object of this invention is to provide an effervescent mouthwash having sufficient stability so that the flavor and desirable level of effervescence are maintained in the product throughout its anticipated shelf life. Yet another object of this invention is to provide an effervescent mouthwash that is relatively simple to use and allows the user to determine the desired dose. A still further additional object of this invention is to provide a reasonable inexpensive effervescent mouthwash.

The foregoing objects and others which will be apparent from the following description and drawings are accomplished, generally speaking, by providing a two-part effervescing mouthwash composition adapted to be freshly formed by the user with each dose and designed to yield any suitable, desired level of effervescence. More particularly, the objects of this invention are accomplished by providing a two-part carbonated mouthwash composition wherein the two parts are adapted to be mixed with each other substantially immediately before use to form a freshly prepared carbonated mouthwash providing an acceptable level of carbonation.

It has now been found that by providing an effervescent mouthwash composition in two non-effervescing parts and adapted to be mixed with such other substantially immediately prior to use, sufficient effervescence is evolved by reaction of the two parts to produce a freshly formed effervescent mouthwash for a suitable, desired effervescence level. The two-part effervescing mouthwash composition is provided in a package having two compartments, one including an effervescing producing chemical and the other compartment including a complementary reactant suitable for releasing the effervescence of the first compartment upon reaction therewith. A more particular embodiment comprises a two-part carbonated mouthwash composition in a package having two non-carbonated component compartments, one including a carbon dioxide chemical source and the other including a reactant, such as an acid source, which upon reaction with the carbon dioxide source in the first compartment releases carbon dioxide. Available carbon dioxide in the use of such a composition is excellent because bubble formation is not induced by suspended insolubles.

While the invention is illustrated most particularly hereinafter with regard to an effervescent mouthwash composition of the carbonated mouthwash type the invention is also applicable to other effervescent compositions such as, for example, effervescing denture cleansers, effervescing douche products, effervescing medicated liquids, such as cough syrups, and the like.

While any suitable two-compartment container suitable for simultaneous proportionate dispensing of any two liquids that would be reactive in the presence of each other but which provides a beneficial mixture when brought together may be employed for such a packaged effervescent mouthwash composition, an exemplary two-compartment container is illustrated in the drawings in which:

FIG. 1 is a front elevational view, partially in section, of a packaged mouthwash composition of this invention;

FIG. 2 is a side elevational view, partially in section, taken along line A–A′ of the packaged mouthwash composition of FIG. 1 with the plug closure member pivoted upward;

Figure 3:
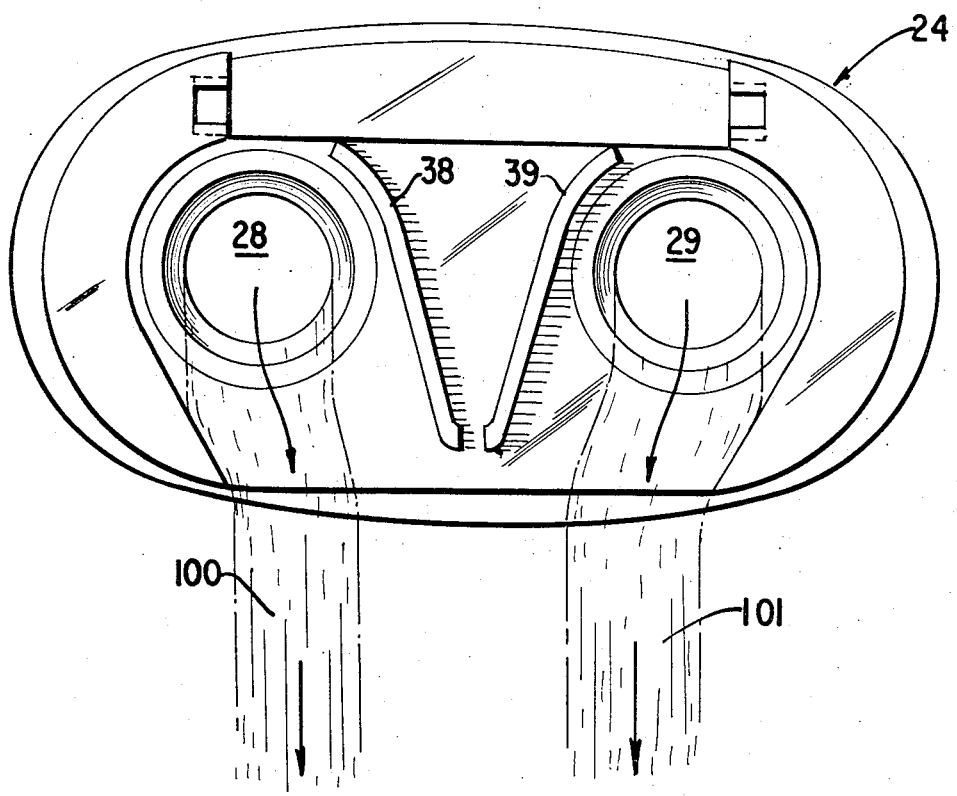
FIG. 3 is a front vertical view of a packaged mouthwash composition of this invention during use.

The effervescence or carbonation source of the one compartmented component may be any one of a wide variety of suitable materials depending upon the particular requirements of the composition in which it is used. Among the carbonation sources which may be used are inorganic carbonating agents such as cationic salts of carbonates and bicarbonates, for example, sodium or potassium bicarbonate, sodium or potassium carbonates and the like, or organic carbonating agents such as carbamate derivatives and the like or mixture of two or more of the foregoing carbonating agents. For example, since sodium bicarbonate in a hydro-alcoholic solution slowly decomposes to form carbon dioxide and sodium carbonate it is desirable to employ sodium carbonate with the sodium bicarbonate solution to inhibit this decomposition and stabilize the bicarbonate solution. It has been found, for example, that a desirable combination of sodium bicarbonate and sodium carbonate is that wherein the ratio of bicarbonate to carbonate is epproximately 6:1.

The complementary reactant of the other compartmented component may be any one of a wide variety of suitable materials acceptable for release of the effervescing or carbonation agent of the first compartment and the selection of this complementary reactant will depend upon the particular requirement of the system in which it is used and particularly on the source of the effervescing or carbonation agent. Among the complementary reactants which may be used are the acids capable of releasing carbon dioxide from bicarbonate and carbonate salt solutions such as, for example, citric, tartaric and malic acid as well as other non-toxic organic acids such as fumaric, adipic, succinic and the like. Also, inorganic acids, for example, phosphoric acid, or mixtures of organic acids, inorganic acids or organic and inorganic acids together may also be employed.

The packaged two-compartment effervescent mouthwash composition of this invention may include any suitable conventional ingredients. The ingredients commonly employed in mouthwash compositions include, for example, flavoring agents, antifoam agents, alcohols, antimicrobial agents, sweetening agents, surface active agents, deodorizing agents, coloring agents, bactericidal agents, astringent agents and the like. Any number of the foregoing ingredients as well as other conventional ingredients may be present in the compositions of this invention.

The quantity of effervescing or carbonation producing reactants employed in the two-compartmented composition will vary in part upon the reactants employed, and in part upon the desired quantity of carbon dioxide to be available from the two-solution system. It is generally desired that the carbonation level produced by the two-solution system of the present invention range from about 0.2% to about 2.0% although levels both above and below this range may also be employed if desirable. However, if levels are too high there will be undesirable gas expansion in the mouth of the user whereas too low a level of carbonation results in a mouthwash having a flat taste. The desired range of carbonation generally varies from 0.3% to 1.0% with a preferred range of from 0.4% to 0.8%, most preferably about 0.46%. The quantity of carbon dioxide available from the two-solution system of this invention may exceed carbon dioxide levels now found in effervescent tablets, granules and powders as well as carbonated liquids. As an example, a 10% solution of sodium bicarbonate metered 1:1 with a solution of an appropriate acid source will yield 2.6% carbon dioxide. Higher carbon dioxide levels can be obtained, for example, by increasing the metering ratio of bicarbonate to acid solution. Not only may more carbon dioxide be produced in these systems but more carbon dioxide remains available as a super saturated solution because there are no insolubles to act as nucleation sites for bubble formation.

Illustrative of a typical example of a two-solution carbonated mouthwash of this invention is a mouthwash of the following formulation:

| Ingredient | Grams | |
|---|---|---|
| | Alkaline solution | Acid solution |
| Sodium bicarbonate | 2.9110 | |
| Sodium carbonate (monohydrate) | 0.4770 | |
| Citric acid | | 1.6000 |
| Menthol | 0.0225 | 0.0225 |
| Peppermint oil | 0.0563 | 0.0563 |
| Cetyl pyridinium chloride | | 0.0500 |
| Ethyl alcohol U.S.P | 15.8000 | 15.8000 |
| Sodium saccharin | 0.0400 | 0.0400 |
| Silicone antifoam | | 0.0020 |
| FD & C Blue No. 1 | 0.0001 | 0.0001 |
| Purified water, add to make | ¹ 100.0000 | ¹ 100.0000 |

¹ Milliliters.

Both solutions are prepared in a similar manner. The menthol and peppermint oil are dissolved in the alcohol. The reactants, citric acid in the acid solution and sodium bicarbonate and sodium carbonate in the alkaline solution, sodium saccharin, silicone antifoam and cetyl pyridinium chloride (in the acid solution only) are dissolved in a portion of the water and the resultant alcohol and water solutions are combined and filtered. The remaining water and FD & C blue dye are added after filtration and the acid solution and alkaline solution are each placed in a separate compartment of a suitable two-compartment container such as hereinafter described. When approximately equal volumes of these solutions are mixed upon release of the solutions from the two-compartment container an effervescing solution is formed which is used as a pleasant carbonated mouthwash. As one rinses with the product the carbon dioxide present as a super-saturated solution is released as pinpoint bubbles. After using the product a stimulating feeling remains in the mouth, particularly along gum margins for about 10 to 30 minutes. This sensation is not duplicated with physically carbonated mouthwash formulations or those obtained from tablets, granules or capsules.

The metering ratio of the two solutions of the two-solution system may be widely varied depending upon the effect desired of the mouthwash composition and also the desired level of carbon dioxide. However, it is generally desirable to avoid metering ratios that produce significant concentrations of free acid resulting in a noticeable tart taste. Significant quantities of about 1% to 2% of free carbonate salt can be tolerated without significantly affecting taste characteristics thus an excess of alkaline phase reactants can be employed to protect against poor taste, however, the increase in concentration of the alkaline phase should be limited to maintain satisfactory carbonation levels. It has been generally found that the two-solution system of this invention can be adjusted to provide approximate quantities of carbon dioxide source and acid so that an acceptable product is obtained when the metering ratio varies from about 2:1 to 1:2 by volume of carbon dioxide source solution to acid source solution. Tables I, II and III hereinafter show the reaction products obtained from two-solution mouthwash composition of this invention at varied metering ratios for compositions of varied acid-carbon dioxide source concentrations.

TABLE I

Reaction Products of a Two-Phase Carbonated Mouthwash Containing 1.6% Citric Acid and 1.8% Sodium Bicarbonate/Sodium Carbonate at an 87/13 ratio

| Metering ratio | Percent reaction product [1] | | | |
|---|---|---|---|---|
| | Carbon dioxide | Sodium citrate | Citric acid | Sodium bicarbonate |
| 1 volume acid phase to 1 volume bicarbonate phase | 0.5 | 0.9 | 0.0 | 0.0 |
| 2 volumes acid phase to 1 volume bicarbonate phase | 0.3 | 0.6 | 0.5 | 0.0 |
| 2 volumes bicarbonate phase to 1 volume acid phase | 0.3 | 0.6 | 0.0 | 0.6 |

[1] See footnote, Table III.

TABLE II

Reaction Products of a Two-Phase Carbonated Mouthwash Containing 1.6% Citric Acid and 3.8% Sodium Bicarbonate/Sodium Carbonate at an 87/13 ratio

| Metering ratio | Percent reaction product [1] | | | |
|---|---|---|---|---|
| | Carbon dioxide | Sodium citrate | Citric acid | Sodium bicarbonate |
| 1 volume acid phase to 1 volume bicarbonate phase | 0.5 | 0.9 | 0.0 | 1.0 |
| 2 volumes acid phase to 1 volume bicarbonate phase | 0.6 | 1.2 | 0.0 | 0.1 |
| 2 volumes bicarbonate phase to 1 volume acid phase | 0.3 | 0.6 | 0.0 | 2.0 |

[1] See footnote, Table III.

TABLE III

Reaction Products of a Two-Phase Carbonated Mourth wash Containing 1.6% Citric Acid and 3.5% Sodium Bicarbonate/Sodium Carbonate at an 87/13 ratio

| Metering ratio | Percent reaction product [1] | | | |
|---|---|---|---|---|
| | Carbon dioxide | Sodium citrate | Citric acid | Sodium bicarbonate |
| 1 volume acid phase to 1 volume bicarbonate phase | 0.5 | 0.9 | 0.0 | 0.8 |
| 2 volumes acid phase to 1 volume bicarbonate phase | 0.6 | 1.2 | 0.05 | 0.0 |
| 2 volumes bicarbonate phase to 1 volume acid phase | 0.3 | 0.6 | 0.0 | 1.7 |

[1] Calculated values assume reaction went to completion.

Illustrative of a typical example of a two-solution carbonated cough medication of this invention is a cough medication of the following formulation:

| Ingredient | Grams | |
|---|---|---|
| | Alkaline solution | Acid solution |
| Sodium bicarbonate | 2.911 | |
| Sodium carbonate (monohydrate) | 0.477 | |
| Citric acid, hydrous | | 2.000 |
| Sodium benzoate | 0.100 | 0.100 |
| Sucrose | 30.000 | 30.000 |
| FD & C Red No. 2 | 0.005 | 0.005 |
| Destromethorphan hydrobromide | | 0.150 |
| Imitation wild cherry flavor | 0.100 | 0.100 |
| Purified water, add to make | [1] 100.000 | [1] 100.000 |

[1] Milliliters.

Both solutions are prepared in a similar manner. In the alkaline solution, the sodium carbonate, sodium bicarbonate, sodium benzoate, sucrose, FD & C Red No. 2 and flavor are dissolved in the water and the solution filtered. In the acid solution, the sodium benzoate, citric acid, dextromethhorphan hydrobromide, sucrose, FD & C Red No. 2 and flavor are dissolved in water and the solution filtered. The acid solution and alkaline solution are each placed in a separate compartment of a suitable two-compartment container such as hereinafter described. Approximately ten milliters of each solution may then be dispensed, mixed and the resulting effervescing cough medication taken.

As previously stated, any suitable two-compartment container may be employed for the packaged effervescent mouthwash composition of this invention. The container should, however, permit satisfactory metering and mixing of the two solutions when they are poured from the container as separate streams in a relatively fixed ratio, yet once the two solutions are mixed they must not be capable of flowing back into the container. Dual containers which isolate the acid and alkaline solutions until use, other than the one described hereinafter and in the accompanying drawings, will readily be apparent to those skilled in the art.

A two-compartment container suitable for use in packaging the effervescing composition of this invention, particularly the mouthwash composition, is disclosed in FIGS. 1 and 2 and is designated generally by the reference numeral 10. The two-compartment container 10 comprises an outer container body 11 of generally cylindrical configuration and being non-collapsible with relatively rigid side walls 12. The outer container 11 is subdivided into two inner containers 13 and 14 by a partition 15 joined to a common lower edge 16. Each inner container 13 and 14 terminates upwardly with a neck assembly 17 and 18 of relatively short length and having a central annular top opening 19 and 20 surrounded by an annular boss 21 and 22. One container will contain an alkaline solution 100 and the other container will house an acid solution 101.

The two-compartment container 10 is provided with a closure cap plug unit indicated generally by 23 and comprising a cap member 24 and a pivotally mounted plug closure member 25. Cap member 24 is secured onto neck assemblies 17 and 18 by means of a mechanical interlock of any suitable construction such as by means of downwardly extending annular lipped protrusions 26 and 27 fitted around the bosses 21 and 22 and co-operating with complementary downwardly extending annular discharge openings 28 and 29 formed by ring members 30 and 31 which are fitted into the inner portion of the neck assemblies 17 and 18 to form a leakproof seal between the closure cap plug unit 23 and the two-compartment container 10 at the neck assembly members 17 and 18. It will be recognized, however, that the particular design of the neck assemblies and the closure cap plug unit can be widely varied and still obtain the necessary leakproof seal. It would also be possible for the complete assembly to be molded as a single unit of a suitable plastic material if desired.

Figure 4:
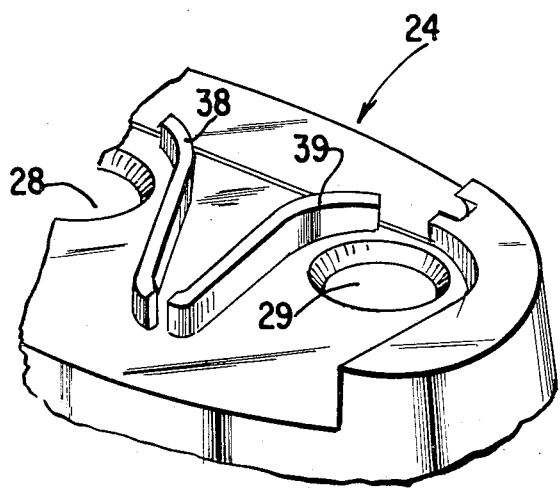
FIG. 4 is a partial oblique view of the top of a two-compartment package suitable for use in this invention.

Ring members 30 and 31 forming annular discharge openings 28 and 29 are each doubly notched 32, 33 and 34, 35 near their top edge in such a manner as to mate with co-operating notched downwardly extending annular plug closures 36 and 37, of plug closure member 25. Referring to FIGS. 3 and 4 it is seen that cap member 24 is provided with a pair of spaced, raised rib members 38 and 39 between discharge openings 28 and 29 and adapted to prevent premature mixing of the two solutions as well to prevent solution from one compartment flowing into solution in the other compartment. The illustrated raised rib members 38 and 39 are spaced such that their axis diverge at the rear of the cap member 24 and converge near the front end of cap member 24. A suitable arrangement is where the axis of the two raised rib members converge at a point slightly in front of the cap member.

An illustrative embodiment of this invention comprises the hereinbefore described typical two-solution mouthwash composition packaged in the container disclosed in FIG. 1 with the alkaline solution being housed in one compartment of the container and the acid solution being housed in the other compartment.

The packaged two-solution mouthwash composition is employed by a user simply by emptying the desired amounts of mouthwash composition into a suitable container such as glass or cup or the like. This is accomplished with the packaged composition described above by tipping the two-compartment container 10 to a substantially horizontal position as shown in FIG. 3. Each of the two solutions 100 and 101 is thereby allowed to flow by gravity from the container 10 in a substantially uniform flow in a ratio that is controlled by selecting the relative size of the discharge openings 28 and 29. It has been found that a minimum internal exit orifice diameter of about 0.4" is generally employed since smaller diameter orifices result in more erratic flow due to air bubble blockage. As the two solutions flow from the container 10 the solutions are mixed and form an effervescing mouthwash composition of desirable carbonation level and with enhanced stability and flow characteristics.

What is claimed is:

1. A packaged effervescible mouthwash composition, releasing bubbles of supersaturated carbon dioxide solution effective, when dispensed from any suitable container, to cause a stimulating sensation in the mouth along gum margins said package having two compartments for storage of ingredients of said composition from which the ingredients are adapted to be dispensed simultaneously and in proportions for reaction with each other, the first compartment containing a carbon dioxide producing reactant comprising a mixture of cationic salts of carbonates and bicarbonates in a hydro-alcoholic alkaline solution in a ratio of bicarbonate to carbonate of about 6 to 1 whereby slow decomposition of bicarbonate to carbonate and carbon dioxide in said hydro-alcoholic solution is effectively inhibited and the second compartment containing an acid solution of a non-toxic organic or inorganic acid or mixtures thereof suitable for releasing the carbon dioxide of the first compartment upon reaction with the carbon dioxide producing reactant so that a supersaturated carbonated mouthwash having a carbonation level of from about 0.2% to about 2.0% results upon the mixing of the two solutions flowing separately from the two compartment container.

2. A composition of claim 1 wherein the second compartment contains a solution of citric acid.

3. A composition of claim 1 wherein the first compartment contains an alkaline solution of a mixture of sodium bicarbonate and sodium carbonate in a 6:1 ratio.

4. A composition of claim 3 wherein the first compartment also contains flavoring, sweetening and coloring agents in the alkaline solution and the second compartment contains flavoring, sweeting, deodorizing and coloring agents in the acid solution.

5. A composition of claim 1 wherein the two compartmented solutions are adapted to provide a carbonated mouthwash having a carbonation level of from 0.3% to 1.0%.

6. A composition of claim 1 wherein the two compartmented solutions are adapted to provide a carbonated mouthwash having a carbonation level of from 0.4% to 0.8%.

7. A composition of claim 3 wherein the two compartmented solutions are adapted to provide a carbonated mouthwash having a carbonation level of from 0.4% to 0.8%.

8. A composition of claim 1 wherein the ingredients of the two compartments are adapted to be dispensed simultaneously and in substantially equal volumetric proportions for reaction with each other.

9. A composition of claim 3 wherein the ingredients of the two compartments are adapted to be dispensed simultaneously and in substantially equal volumetric proportions for reaction with each other.

10. A method for providing a carbonated mouthwash freshly carbonated substantially immediately prior to use and having a carbonation level of from about 0.2% to about 2.0% releasing bubbles of supersaturated carbon dioxide solution effective, when dispensed from any suitable container, to cause a stimulating sensation in the mouth along gum margins comprising substantially simultaneously discharging and reacting proportionate amounts of two separate and distinct aqueous, non-carbonated solutions into a container from a two compartmented package wherein the two separate and distinct aqueous, non-carbonated solutions are each initially packaged in separate compartments of the two compartment package, the first solution being a hydro-alcoholic alkaline solution of a mixture of cationic salts of carbonates and bicarbonates in a ratio of bicarbonate to carbonate of about 6 to 1 whereby slow decomposition of bicarbonate to carbonate and carbon dioxide in said hydro-alcoholic solution is effectively inhibited, and the second solution being a hydro-alcoholic acid solution of a non-toxic organic or inorganic acid or mixtures thereof suitable for releasing carbon dioxide upon reaction with the first solution.

11. A method of claim 10 wherein the second solution is a hydro-alcoholic acid solution of citric acid.

12. A method of claim 11 wherein the first solution is a hydro-alcoholic alkaline solution of a mixture of sodium bicarbonate and sodium carbonate in a 6:1 ratio.

13. A method of claim 12 wherein the first and second solutions are discharged from the two compartment package in simultaneous and substantially equal volumetric proportions for reaction with each other.

References Cited

UNITED STATES PATENTS

| | | | |
|---|---|---|---|
| 3,467,526 | 9/1969 | Mitchell et al. | 99—79 |
| 3,480,185 | 11/1969 | Steinberg et al. | 222—192 |
| 205,713 | 7/1878 | Wood | 424—44 |
| 3,325,056 | 6/1967 | Lewis | 222—94 |

SHEP K. ROSE, Primary Examiner

U.S. Cl. X.R.

99—78; 222—94